(12) United States Patent
Lohmar et al.

(10) Patent No.: US 10,999,621 B2
(45) Date of Patent: May 4, 2021

(54) TECHNIQUE FOR SYNCHRONIZING RENDERING OF VIDEO FRAMES WITH RENDERING OF AUXILIARY MEDIA

(71) Applicant: TELEFONAKTIEBOLAGET LM ERICSSON (PUBL), Stockholm (SE)

(72) Inventors: Thorsten Lohmar, Aachen (DE); Ali El Essaili, Aachen (DE); Mohamed Ibrahim, Aachen (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/465,817

(22) PCT Filed: Dec. 7, 2016

(86) PCT No.: PCT/EP2016/080115
§ 371 (c)(1),
(2) Date: May 31, 2019

(87) PCT Pub. No.: WO2018/103840
PCT Pub. Date: Jun. 14, 2018

(65) Prior Publication Data
US 2020/0029116 A1    Jan. 23, 2020

(51) Int. Cl.
*H04N 21/43* (2011.01)
*G11B 27/10* (2006.01)
(Continued)

(52) U.S. Cl.
CPC ....... *H04N 21/4307* (2013.01); *G11B 27/105* (2013.01); *H04L 67/02* (2013.01);
(Continued)

(58) Field of Classification Search
CPC ......... H04N 21/4307; H04N 21/23439; H04N 21/6125; H04N 21/8456; H04L 67/02; G11B 27/105
See application file for complete search history.

(56) References Cited

U.S. PATENT DOCUMENTS 6,871,007 B1 * 3/2005 Saeijs ............... G11B 20/12
386/241
2004/0168203 A1 * 8/2004 Seo ............... G11B 27/10
725/135
(Continued)

FOREIGN PATENT DOCUMENTS

WO    2013141874 A1    9/2013

OTHER PUBLICATIONS

Office Action issued in corresponding EP Application No. 16808627.0 dated Dec. 6, 2019, 06 Pages. The references cited therein were previously made of record.
(Continued)

*Primary Examiner* — Oschta I Montoya
(74) *Attorney, Agent, or Firm* — Patent Portfolio Builders, PLLC

(57) ABSTRACT

The present disclosure relates to synchronizing the rendering of video frames included in media file segments with the rendering of auxiliary media. A method implementation of this technique comprises the step of determining, from a sequence of media file segments, a sub-sequence of media file segments, wherein rendering of the sub-sequence is to be overlaid by rendering of auxiliary media starting in a first media file segment of the sub-sequence. The method further comprises determining control information enabling a media client to determine how much rendering of the auxiliary media has progressed upon rendering of each media file segment of the sub-sequence, and initiating a tagging of the (Continued)

media file segments of the sub-sequence with the control information.

16 Claims, 14 Drawing Sheets

(51) Int. Cl.
  *H04L 29/08* (2006.01)
  *H04N 21/2343* (2011.01)
  *H04N 21/61* (2011.01)
  *H04N 21/845* (2011.01)

(52) U.S. Cl.
  CPC ... *H04N 21/23439* (2013.01); *H04N 21/6125* (2013.01); *H04N 21/8456* (2013.01)

(56) References Cited

U.S. PATENT DOCUMENTS

2006/0126510 A1* 6/2006 Russell ............... H04L 1/0083
  370/235
2015/0319505 A1* 11/2015 Patadia ............ H04N 21/23614
  725/34

OTHER PUBLICATIONS

International Search Report and the Written Opinion of the International Searching Authority, issued in corresponding International Application No. PCT/EP2016/080115, dated Aug. 2, 2017, 11 pages.
International Standard ISO/IEC 23009-1, Draft third edition, Dec. 7, 2015 "Information technology—Dynamic adaptive streaming over HTTP (DASH)—Part 1: Media presentation description and segment formats", 192 pages.
International Standard ISO/IEC 23009-1, second edition, May 15, 2014 "Information technology—Dynamic adaptive streaming over HTTP (DASH)—Part 1: Media presentation description and segment formats", 176 pages.

* cited by examiner

TECHNIQUE FOR SYNCHRONIZING RENDERING OF VIDEO FRAMES WITH RENDERING OF AUXILIARY MEDIA

CROSS REFERENCE TO RELATED APPLICATION(S)

This application is a 35 U.S.C. § 371 National Phase Entry Application from PCT/EP2016/080115, filed Dec. 7, 2016, designating the United States, the disclosure of which is incorporated herein by reference in their entirety.

TECHNICAL FIELD

The present disclosure generally relates to the rendering of video content. In particular, a technique for synchronizing the rendering of video content with the rendering of auxiliary media is presented. The technique may be implemented in the form of methods, devices, systems and computer program products.

BACKGROUND

Video streaming over the Internet has become increasingly popular among media consumers. Modern streaming protocols such as Hypertext Transfer Protocol (HTTP) Live Streaming (HLS) and Dynamic Adaptive Streaming over HTTP (DASH), also known as MPEG-DASH, enable streaming of video content (e.g., a TV program or a movie) over the Internet from conventional HTTP web servers. Such streaming protocols break a media file including the video content into a sequence of small HTTP-based media file segments, wherein each media file segment contains a short interval of the overall video playback time of the video content.

In adaptive streaming scenarios, the video content and, thus, the file segments are made available at a variety of different bit rates. While the video content is being rendered by a media client, the media client automatically selects the proper bitrate version of the next file segment to download and render based on the prevailing network conditions. Generally, the media client selects the file segment with the highest bit rate possible that can be downloaded in time without causing stalls or re-buffering events in the rendering and playout.

It is often desirable to overlay the video content with auxiliary media such as sub-titles, banners, animated graphics, consumer information, graphical effects and overlays. To this end, the video content and the auxiliary media are typically encoded jointly into a series of video frames. As such, all media consumers see the same auxiliary media at the same time and with the same quality upon rendering the video frame stream. Moreover, when media consumers seek back and forth in a video frame stream, the auxiliary media will always be in synchronicity with the video content as the two have been "glued together" upon video frame encoding.

A drawback of mixing auxiliary media and video content prior to encoding is the fact that the auxiliary media and the video content cannot be separated on the side of the media client. For this reason the video content and the auxiliary media would have to be encoded into different media file versions to adapt the language (or other aspects) of the auxiliary media to a geographical location of the media consumers, a broadcasting time of the video content, and so on. In case of personalized auxiliary media, a dedicated encoding even has to be performed per media client.

To avoid the resulting encoding overhead, the video content can be encoded individually and the auxiliary media can be distributed separately from but linked to the encoded media file segments. In an exemplary DASH scenario, such links may be created using so-called events. Events are defined in the DASH standard as periodic information signalled to the media client either in a so-called Media Presentation Description (MPD) or "inband" within a DASH segment (see ISO/IEC 23009-1, Information technology—Dynamic adaptive streaming over HTTP (DASH), Part 1: Media presentation description and segment formats, May, 2014).

Now consider an implementation as illustrated in FIG. 1 with a DASH segmenter 10 that segments encoded video content into individual DASH segments, an origin server 20 that provides the DASH segments for download by a DASH-compliant media client 30, an HTTP server 40 with access to a repository 50 for providing auxiliary media in the exemplary form of an HTML-based layover banner. The layover banner is to be rendered in synchronicity with a number of file segments from the encoded video content.

The media client 30 starts by fetching a DASH MPD associated with the video content to be played out in step 1. The MPD contains an indication that custom event messages are inserted in the stream of DASH segments. For each custom event message a so-called listener is created that is triggered when the media client 30 receives a DASH segment carrying the associated event message.

When the listener detects that the media client 30 has received a DASH segment with an associated event message in step 2, the event message is handed over to a custom message handler (i.e., a layover banner handler in the present case). The handler parses the message in step 3 and triggers the media client 30 to fetch an HTML representation of the banner element as referenced in the custom message (steps 4 and 5; the banner element may alternatively be embedded in the DASH segment to avoid steps 4 and 5). Finally, in step 6, the banner element is rendered as overlay to the video segments. DASH inband event messages allow defining a time offset, so that banner rendering does not need to start at DASH segment boundaries.

HTML renderers like browsers always start rendering "from the beginning" of a webpage and once the webpage is completely loaded. This also applies to other HTML elements such as the HTML banner overlay in the scenario of FIG. 1. When the media client 30 has started rendering of the video content before the banner element is to be overlaid with the video content, then the procedure illustrated in FIG. 1 works fine. In particular, the layover banner can be rendered with the desired synchronicity relative to the video content. The media client 30 will start rendering the banner overlay from the beginning once the event message is received.

However, when the media client 30 seeks into the middle of an on-going banner overlay, problems occur since there is no mechanism to indicate "the progress" of an HTML element such as the banner overlay (e.g., to mimic "render the element and adjust its timing as it would have been loaded 20 sec ago"). That is, once the media client 30 receives a media file segment containing the event message associated with the banner overlay, the banner overlay will run from start to the end with its own timing, not taking into consideration the video content being rendered.

In many cases such as a traditional TV program scenario, the auxiliary media are complementary to the video content, so if the media consumer decided to rewind or skip few seconds of the video content rendering, rendering of the auxiliary media is expected to react exactly as rendering of the video content. However, in case of a DASH event message implementation with HTML-based auxiliary media, the HTML-based auxiliary media will run separately from the video content, which leads to a lack of synchronicity as will now be explained with reference to FIG. 2.

FIG. 2 illustrates a scenario in which an animated banner overlay is scheduled to be rendered in a TV program assuming that "t" is the timeline for the TV program (media presentation time) and "t'" is the timeline for the animated banner overlay. For simplicity, the banner overlay is an HTML element containing animated content of a man walking linearly along the banner. At t=15 sec of video playout time ("media time"), the media client 30 receives an event message in file segment x. Once segment x is received, the media client 30 starts rendering the HTML element on top of the video content and the man starts walking from the left side of the banner towards the right side thereof (i.e., at t'=0 sec and t=15 sec). After 15 sec the man reaches the right side of the banner. Finally, the banner disappears at t=30 sec and t'=15 sec.

FIG. 3 illustrates a similar scenario as FIG. 2. Here, it is assumed that the media consumer decided to seek forward by 10 sec after the media client 30 has received segment x and rendering of the banner overlay has started from t'=0 sec. The expected behaviour is that the banner overlay is also seeking forward. That is, once the playout resumes after the seek forward, the walking man should appear at t'=10 seconds. However, the animation in the banner overlay is running with its own timing and, therefore, the animated man will keep walking linearly without being affected by the seek forward command. Such behaviour will cause the banner overlay to be out of synchronicity with the video content (i.e., the TV program).

A similar scenario occurs when the media consumer seeks forward outside the time boundary of the banner overlay. Assume that the media consumer seeks to t=40 sec. In a consistent scenario, the banner overlay should disappear. However, in the scenario illustrated in FIGS. 2 and 3 the banner overlay will continue rendering.

Another scenario is shown in FIG. 4. The media consumer starts playout of the TV program at t=0 sec and seeks directly to t=20 sec. In this case the media client 30 misses the event message ingested in segment X and will therefore not render the banner overlay at all.

SUMMARY

Accordingly, there is a need for a solution that permits a better synchronization of the rendering of video frames and auxiliary media.

According to one aspect, a method of tagging media file segments with control information for a synchronized rendering of video frames included in the media file segments and auxiliary media by a media client is presented. The method comprises determining, from a sequence of media file segments, a sub-sequence of media file segments, wherein rendering of the sub-sequence is to be overlaid by rendering of auxiliary media starting in a first media file segment of the sub-sequence, and determining control information enabling the media client to determine how much rendering of the auxiliary media has progressed upon rendering of each media file segment of the sub-sequence. The method also comprises initiating a tagging of the media file segments of the sub-sequence with the control information.

The auxiliary media may describe a simple overlay case, in which one or more animation, text or graphics elements are overlaid to the video content rendering. The auxiliary media may additionally or as an alternative control a shrinking, moving or other visual processing of the video content, so that for example framing effects can be generated. As such, the auxiliary media may generally change the manner in which the video content is presented to a user compared to a regular presentation in the absence of said auxiliary media.

In one implementation, for each media file segment of the sub-sequence associated control information is individually determined, so that the respective media file segment can be tagged with the associated control information. In such a case the control information may be indicative of a distance between the first media file segment or start of rendering of the auxiliary media in the first media file segment on the one hand and the respective media file segment on the other hand. The distance may be expressed as a number of media file segments between the first media file segment and the respective media file segment. Additionally, or in the alternative, the distance may be expressed as a period of time between start of rendering of the auxiliary media in the first media file segment and the respective media file segment.

In certain variants the control information is indicative of, or enables the media client to determine, a rendering start time of the auxiliary media relative to a rendering start time of one of the sequence of media file segments and a respective media file segment of the sub-sequence.

Rendering of the auxiliary media may be configured to start with start of the first media file segment. Alternatively, rendering may start a predefined time shift relative to the start of the first video segment.

Each of the media file segments in the sub-sequence may further comprise at least a portion of the auxiliary media or a link to at least a portion of the auxiliary media. In such a case, the auxiliary media portion may be progressed relative to a full version of the auxiliary media by a distance between start of rendering of the auxiliary media in the first media file segment and the respective media file segment.

Tagging the one or more media file segments may comprise packing the control information in a logical container in the respective media file segment. The logical container may have an identifier configured to suppress repeated processing by the media client of logical containers bearing the same identifier in different media file segments. Further, the same identifier is assigned to the media file segments in the sub-sequence.

The media file segments conform to DASH or other adaptive or non-adaptive streaming protocols. In a DASH scenario, the logical container can be an Event Inband Message, EMSG. The auxiliary media may be provided in an HTML format (e.g., in accordance with the HTML5 specification).

The auxiliary media may be personalized in regard of individual media recipients or groups of media recipients. The media recipient groups may be defined by individual languages underlying the auxiliary media (e.g., subtitles).

According to a further aspect a method of rendering video frames in synchronization with auxiliary media by a media client is provided. The method comprises receiving a sequence of media file segments, each media file segment comprising a plurality of video frames, wherein rendering of a sub-sequence of the media file segments is to be overlaid with rendering of the auxiliary media starting in a first media file segment of the sub-sequence. The method further comprises determining, from control information included the sub-sequence of media file segments and for a respective one of the media file segments of the sub-sequence, how much rendering of the auxiliary media has progressed upon rendering the respective media file segment. Moreover, the method comprises rendering the video frames of the respective media file segment of the sub-sequence and rendering the auxiliary media in accordance with the determined progression.

Each media file segment of the sub-sequence may comprise individual control information specifically associated with the respective media file segment. As such, the control information may be indicative of a distance between the first media file segment or start of rendering of the auxiliary media in the first media file segment on the one hand and the respective media file segment on the other hand. In another variant, the control information is indicative of, or enables the media client to determine, a rendering start time of the auxiliary media relative to one or the sequence of media file segments and a respective media file segment of the sub-sequence.

The method may further comprise receiving, during rendering of the sequence of media file segments, a seek command defining a seek parameter, determining a modified seek parameter based on the seek parameter and the control information, and rendering the video frames in accordance with the seek parameter and rendering the auxiliary media based on the modified seek parameter. In some cases, a progressed version of the auxiliary media may be requested based on the modified seek parameter. Then, the progressed version of the auxiliary media may be received, wherein the progressed version of the auxiliary media is rendered.

Each of the media file segments in the sub-sequence may further comprise at least a portion of the auxiliary media. Alternatively, each of the media file segments in the sub-sequence may further comprise a link to at least a portion of the auxiliary media, and wherein the method then further comprises requesting and receiving at least a portion of the auxiliary media via the link.

Also provided is a computer program product comprising program code portions to perform the steps of any of the preceding claims when the computer program product is run on a computing device. The computer program product may be stored on a computer-readable recording medium such as a semiconductor memory, CD-ROM, DVD-ROM, and so on.

According to a further aspect a controller configured to initiate tagging of media file segments with control information for a synchronized rendering of video frames included in the media file segments and auxiliary media by a media client is provided. The controller is configured to determine, from a sequence of media file segments, a sub-sequence of media file segments, wherein rendering of the sub-sequence is to be overlaid by rendering of auxiliary media starting in a first media file segment of the sub-sequence. The controller is further configured to determine control information enabling the media client to determine how much rendering of the auxiliary media has progressed upon rendering of each media file segment of the sub-sequence, and to initiate a tagging of the media file segments of the sub-sequence with the control information.

The controller may further be configured to perform any of the method aspects presented herein.

According to a still further aspect, a media client configured to render video frames in synchronization with auxiliary media is provided. The media client is configured to receive a sequence of media file segments, each media file segment comprising a plurality of video frames, wherein rendering of a sub-sequence of the media file segments is to be overlaid with rendering of the auxiliary media starting in a first media file segment of the sub-sequence. The media client is further configure to determine, from control information included the sub-sequence of media file segments and for a respective one of the media file segments of the sub-sequence, how much rendering of the auxiliary media has progressed upon rendering the respective media file segment. Still further, the media client is configured to render the video frames of the respective media file segment of the sub-sequence and rendering the auxiliary media in accordance with the determined progression.

The media client may further be configured to perform any of the method aspects presented herein.

Also provided is a content distribution system comprising the controller and the media client as presented herein.

BRIEF DESCRIPTION OF THE DRAWINGS

Further details of the present disclosure become apparent from the following description of embodiments and the drawings, wherein.

DETAILED DESCRIPTION

In the following description, for purposes of explanation and not limitation, specific details are set forth, such as specific streaming protocols and specific signaling procedures, in order to provide a thorough understanding of the technique discussed herein. It will be apparent to one skilled in the art that the technique may be practiced in other embodiments that depart from these specific details. While, for example, the embodiments will primarily be described in a DASH context, the present disclosure can also be implemented using HLS or any other adaptive or non-adaptive streaming protocol.

Moreover, those skilled in the art will appreciate that the services, functions, steps and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced Reduced Instruction Set Computer (RISC) Machine (ARM).

It will also be appreciated that, while the following embodiments are primarily described in the context of methods and devices, the present disclosure may also be embodied in a computer program product as well as in a system comprising one or more processors and one or more memories coupled to the one or more processors, wherein the one or more memories are encoded with one or more programs that perform the services, functions, steps and implement the modules disclosed herein when executed on the one or more processors.

Figure 5:
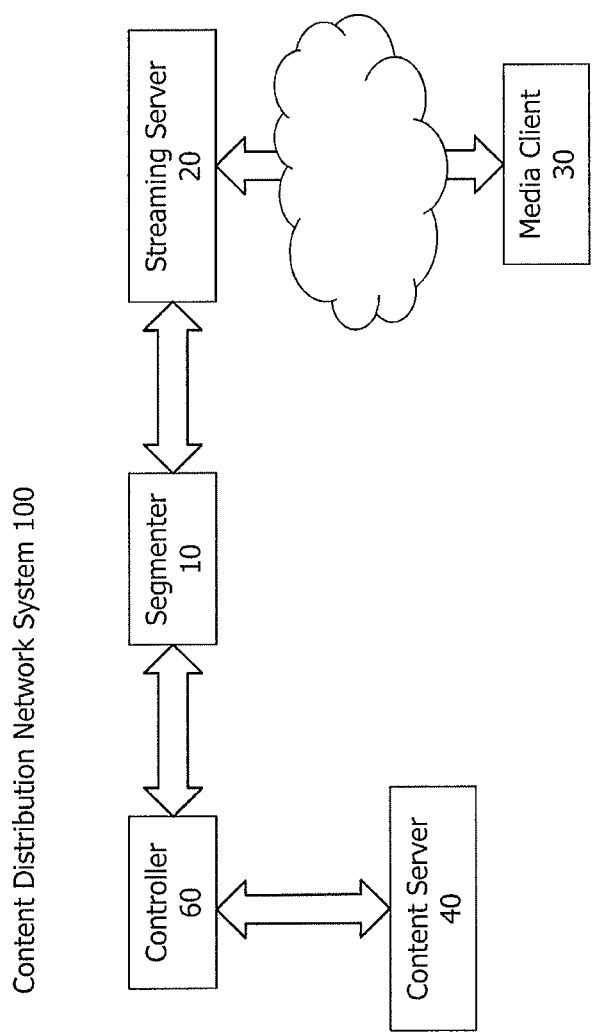
FIG. 5 illustrates an embodiment of a media content distribution system.

FIG. 5 shows an embodiment of a content distribution network system 100 in which the technique proposed herein may be implemented. The same reference numerals as in FIG. 1 will be used to describe the same or similar components.

Figure 6:
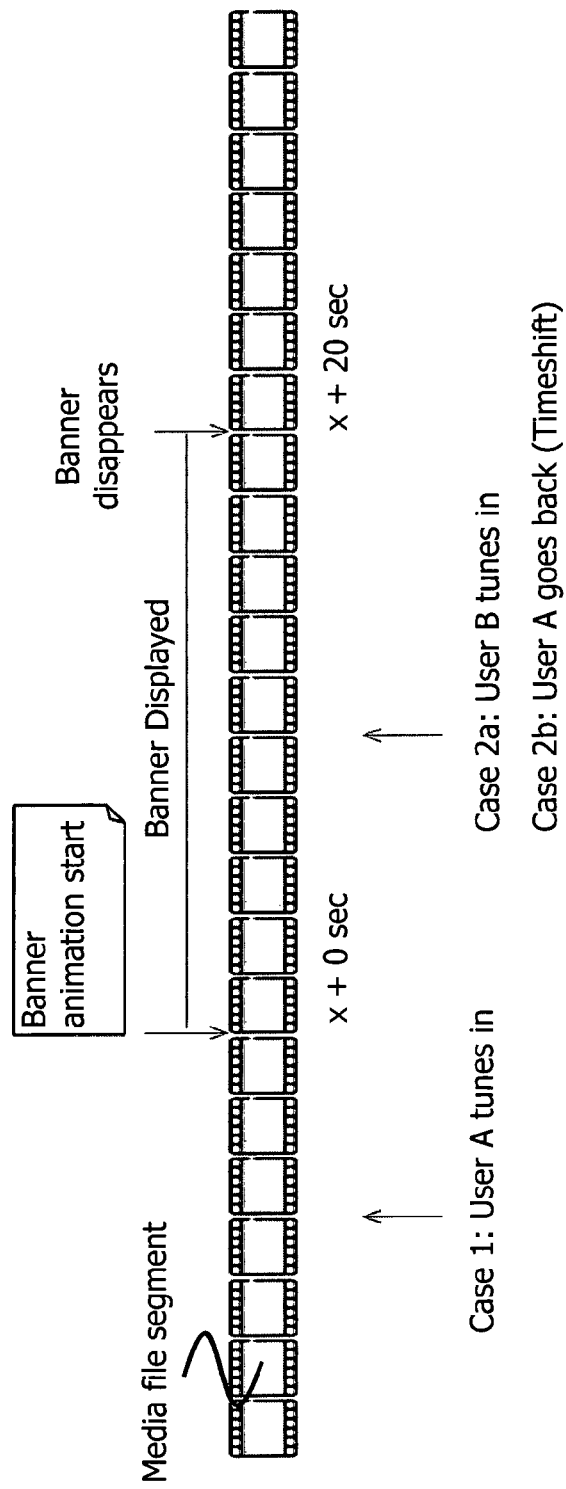
FIG. 6 illustrates a media file segment sequence with overlaid auxiliary media.

As illustrated in FIG. 6, the network system 100 comprises a segmenter 10 that segments encoded video content into individual media file segments. Each media file segment will contain a number of video frames corresponding to a certain portion of the video content (e.g., from 0.1 sec to several seconds of video presentation time).

The network system 100 further comprises an origin or streaming server 20 configured to provide the media file segments generated by the segmenter 10 for being downloaded by a media client 30. The media segment file download may occur via any communication network, such as the Internet. The media client 30 may take the form of a mobile or a stationary terminal device, such as a Smartphone, tablet computer, notebook or desktop computer.

A content server 40 is configured to provide auxiliary media for being overlaid with the video content upon rendering same by the media client 30. The auxiliary media may take any form, such as banners, animations, widgets, sub-titles, media control data influencing a rendering of the video content (e.g., a shrinking, tilting, etc. thereof), or any combination thereof.

A controller 60 is configured to determine control information that enables the media client 30 to determine how much rendering of the auxiliary media has progressed upon rendering of media file segments that temporally overlap with rendering of the auxiliary media. The controller 60 is further configured to initiating a tagging of specific media file segments with the corresponding control information. Specifically, the controller 60 may provide the corresponding control information to the segmenter 10 and instruct the segmenter 10 to perform the tagging. In other variants, the controller 60 may perform the tagging itself.

As has been explained above with reference to FIG. 4, the media client 30 may start playout of the TV program at t=0 sec and seek directly to t=20 sec. In this case the media client 30 would normally miss the event message ingested in segment X and would therefore not render the banner overlay at all (see discussion of FIGS. 2 and 3 above). A hypothetical solution to this problem could be based on specifics of the DASH specification. The DASH specification requires that event messages with the same identifier are ignored by the media client 30 shown in FIG. 1. The segmenter 10 could thus incorporate the same event message (with the same identifier) in all DASH segments played out during the lifetime of the banner overlay. In case the media client 30 would seek directly to segment X+1, the event message carried in that segment will trigger the overlay banner to start, while other media clients that received the event message already in segment X will ignore the event messages with the same identifier in subsequent segments. However, this hypothetical solution does not solve the lack of synchronization between the TV program and the banner animation because the media client 30 will render the banner animation to start from t'=0, while it should start at t'=5 (t=20 sec).

More generally speaking, problems occur when the auxiliary media run from start to end with their own timing and are thus independent from seek or playout operations in regard of the video content. As such, when the media client 30 seeks forward outside of the auxiliary media timeline, then the auxiliary media do not necessarily disappear. When media client 30 jumps back into the time timeline when the auxiliary media was shown, in the scenario illustrated in FIG. 4 the auxiliary media may start from the beginning and will by not synchronized with the current video position.

To improve synchronicity, in one embodiment, the rendering of auxiliary media is therefore controlled by the controller 60 such that the rendering may always start from a certain media time position as generally shown in FIG. 6. Specifically, FIG. 6 illustrates a sequence of media file segments that correspond to a certain video content distribution scenario (e.g., a TV program or a movie). In FIG. 6, each media file segment contains a number of video frames (i.e., encoded video content data items) and corresponds to 2 sec media rendering time.

A predefined and continuous sub-sequence of this sequence of media file segments is to be overlaid with the rendering of auxiliary media starting in the first media file segment of the sub-sequence. Assuming, for example, that the auxiliary media correspond to a banner animation as discussed above in regard of FIGS. 2 to 4, the start (FIG. 6: segment x) and lifetime (FIG. 6: 20 sec) of the banner animation—and, generally, the start and lifetime of the auxiliary media rendering—will define the sub-sequence of media file segments.

When the media client starts rendering the video content before the start point of the auxiliary media rendering, the auxiliary media is rendered from the start point. This is illustrated in FIG. 6 by the media consumer, or user, A tuning in via an associated media client 30 (case 1). When the media client 30 seeks forward to a time position in the middle of the auxiliary media lifetime or seeks back to a time position in the auxiliary media lifetime (see case 2b in FIG. 6), then the actual auxiliary media rendering is adjusted by the media client 30 based on the progression of the auxiliary media rendering relative to a virtual start of the rendering. The same applies if a media consumer, or user, B tunes in during the lifetime of the auxiliary media (case 2a in FIG. 6).

In one exemplary implementation, control information (e.g., compliant with the DASH specification or any other streaming standard) may be embedded in each of the sub-sequence of media file segments that are defined by the start and lifetime of the auxiliary media. For this reason the control information will be transmitted "inband" together with the media file segments. Specifically, the respective media file segment is tagged with control information that enables the media client 30 to determine how much rendering of the auxiliary media has progressed upon rendering a particular media file segment during the lifetime of the auxiliary media to ensure asynchronous rendering in cases 2a and 2b as illustrated in FIG. 6).

Each item of control information may be represented in various ways, for example as a sequence number of a progress timestamp, which allows deriving the virtual play duration of the auxiliary media (i.e., how much has rendering of the auxiliary media progressed at the time of joining the video segment stream by the media client 30). For instance, when the media client 30 joins 5 segments after the auxiliary media start time as illustrated in FIG. 6 (case 2a), then the control information in the respective media file segment either contains the index 4 (5th segment with the same inband control information) or the timecode 10 (assuming 2 sec segment duration). The media client 30 can then obtain (e.g., fetch from a remote server or from the media file segment) the auxiliary media data (e.g., a HTML5 document) and adjust progress of the rendering (and playout) accordingly. Since each auxiliary media item is implemented independently, it might alternatively be considered to fetch either an already adjusted auxiliary media item or to fetch a small adjustment file. The adjustment file could be a JavaScript Object Notation (JSON) file or a small JavaScript snippet, which performs the required manipulation of the auxiliary media with respect to its virtual start of rendering.

In some variants, each item of inband control information may, for example, contain a relative timestamp for the starting time of the auxiliary media (in media presentation time) relative to the current playout time of the auxiliary media. The media client 30 can then calculate the required time shift between the auxiliary media rendering and the video content rendering (relative to a virtual start point of the auxiliary media relative to the video content rendering) and adjust progression of the auxiliary media timeline accordingly.

Optionally, a precision of synchronization between the auxiliary media and the video content may be signalled (e.g., by a media file segment source or an auxiliary media source). For example, in some cases it may be preferred that the auxiliary media always start at the beginning of their timeline, even if a slightly inconsistent playback behaviour will result. In other cases, only a coarse synchronization may be required. For instance, video frame accurate synchronization may be desired for trailing banners and only media file segment accurate synchronization may be required for mid role overlays.

Figure 7:
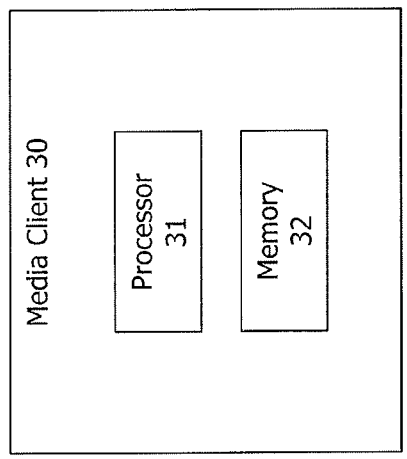
FIG. 7 illustrates embodiments of a controller and a media client, respectively.
Figure 7:
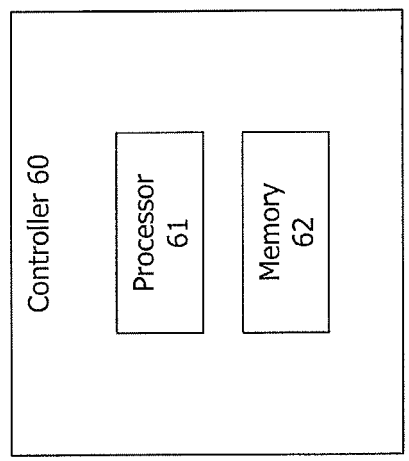

To realize the above and further functionalities, the controller 60 is configured to initiate tagging of media file segments with control information for a synchronized rendering of video frames included in the media file segments on the one hand and of auxiliary media on the other hand. To this end, the controller 60 in one embodiment comprises a processor 61 and a memory 62 as shown in FIG. 7. The memory 62 is coupled to the processor 61 and comprises program code portions that control the controller 60 to perform aspects of the technique presented herein upon executing the program code portions.

In a similar manner, the media client 30 is configured t for a synchronized rendering of video frames included in the media file segments on the one hand and of auxiliary media on the other hand. To this end, the media client 30 in one embodiment comprises a processor 31 and a memory 32 as shown in FIG. 7. The memory 32 is coupled to the processor 31 and comprises program code portions that control the media client to perform aspects of the technique presented herein upon executing the program code portions.

Figure 8:
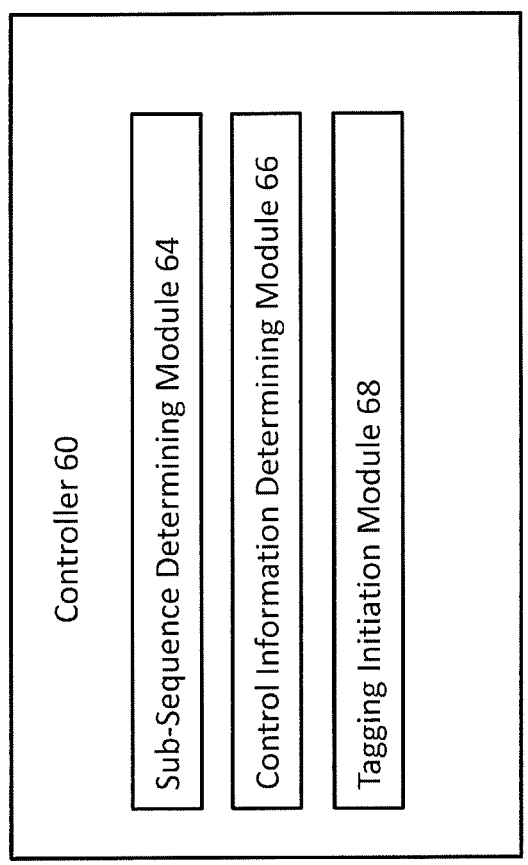
FIGS. 8 & 9 illustrate further embodiments of a controller and a media client, respectively.

In a further exemplary embodiment illustrated in FIG. 8, the controller 60 comprises a sub-sequence determining module 64, a control information determining module 66 as well as a tagging initiation module 68. The modules 64, 66 and 68 may be configured as hardware entities or may be stored as computer program code in the memory 62.

Figure 9:
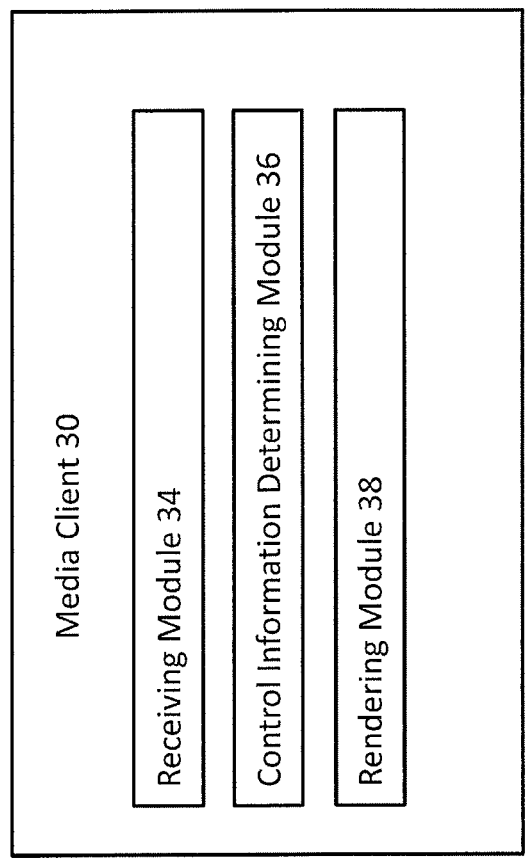

In a similar manner, FIG. 9 illustrates an embodiment of the media client 30 with a receiving module 34, a control information determining module 36 and a rendering module 38. The modules 34, 36, 38 may be realized as hardware entities or may be stored as computer program code in the memory 32 of the media client 30.

Figure 10:
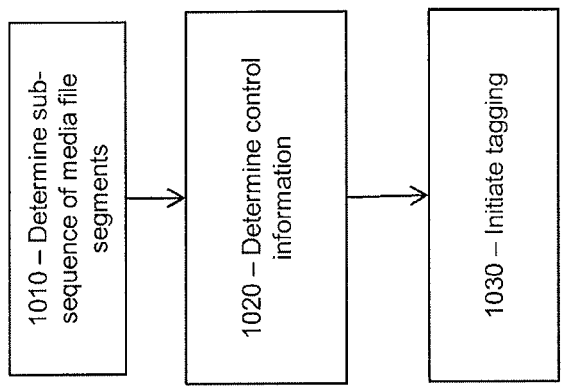
FIGS. 10 & 11 illustrate flow diagrams of method embodiments for synchronizing the rendering of video frames and auxiliary media.

FIG. 10 illustrates a method embodiment performed by the controller 60 under control of computer program code in the memory 61 and/or via the module 64, 66 and 68 illustrated in FIG. 8.

In step 1010, the controller 60 determines a pre-defined rendering starting point of the auxiliary media relative to a sequence of media file segments and rendering duration ("lifetime") of the auxiliary media. Specifically, in step 1010 a sub-sequence of media files segments is determined that will be overlaid by auxiliary media rendering starting in a first media file segment of the sub-sequence (see FIG. 6). Typically, the auxiliary media rendering will stop in a last media file segment of the sub-sequence. As such, the duration of the sub-sequence of media file segments (and playout time) will approximately correspond to the lifetime of the auxiliary media.

In a further step 1020, the controller 60 determines control information that enables the media client 30 to determine how much rendering of the auxiliary media has progressed upon rendering of each media file segment of the sub-sequence. The control information may be expressed in various ways, for example in the form of a distance between the first media file segment of the sub-sequence or start of rendering of the auxiliary media in the first media file segment of the sub-sequence on the one hand and, on the other hand, the respective media file segments. This distance may be expressed in the form of a number of media file segments between the first media file segment and the respective media file segment. Alternatively, the distance may be expressed as a period of time between start of rendering of the auxiliary media in the first media file segment of the sub-sequence and the respective media file segment. In these cases, the control information associated with each media file segment of the sub-sequence is individually determined dependent on the position of the corresponding media file segment within the sequence or sub-sequence of media file segments.

In other variants the control information may be indicative of a rendering start time of the auxiliary media relative to the rendering start time of one of the sequence of media file segments and a respective media file segment of the sub-sequence.

Alternatively, the control information may simply enable the media client 30 to determine the auxiliary media rendering start time. In the latter case, the control information may have the same content for each media file segment of the sub-sequence.

In a further step 1030, the controller initiates a tagging of the media file segments of the sub-sequence with the corresponding control information. In some variants, the controller 60 may perform the tagging itself. In other variants, the controller 60 may instruct the segmenter 10 or any other component of the content distribution network 100 to perform the tagging.

Figure 11:
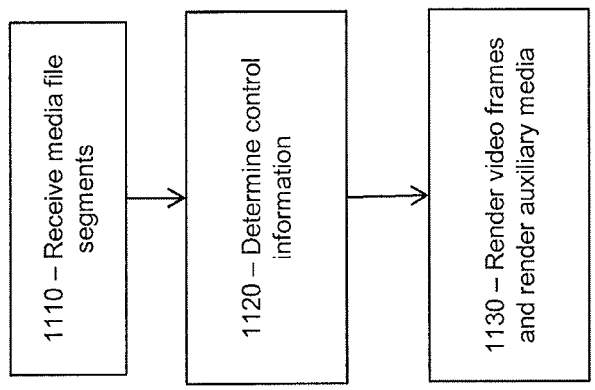

FIG. 11 shows a further method embodiment performed by the media client 30 in connection with rendering video frames in synchronization with auxiliary media under control of computer program code in the memory 31 and/or via the module 34, 36 and 38 illustrated in FIG. 8.

In a first step 1101, the media client 30 receives a sequence of media file segments. The media file segments may, for example, be individually downloaded one after the other via HTTP from the streaming server 20 shown in FIG. 5. The media file segments may thus each be separately received in response to a particular request from the client 30. As explained above with reference to, for example, FIG. 6, rendering of a sub-sequence of the received media file segments is to be overlaid with rendering of auxiliary media starting in a first media file segment of the sub-sequence.

In step 1120, the media client 30 determines, from control information included in the sub-sequence of media file segments and for a respective one of the media file segments of the sub-sequence, how much rendering of the auxiliary media has progressed upon rendering the respective media file segment. The determining step 1120 can in particular be performed in response to a seek command of a media consumer (e.g., after the media client 30 as previously rendered video frames in one or more of the media file segments of the sub-sequence together with the corresponding auxiliary media).

In a further step 1130, the media client 30 renders the video frames of the respective media file segment of the sub-sequence and, at the same time, renders the auxiliary media in accordance with the progression determined in step 1120.

Figure 1:
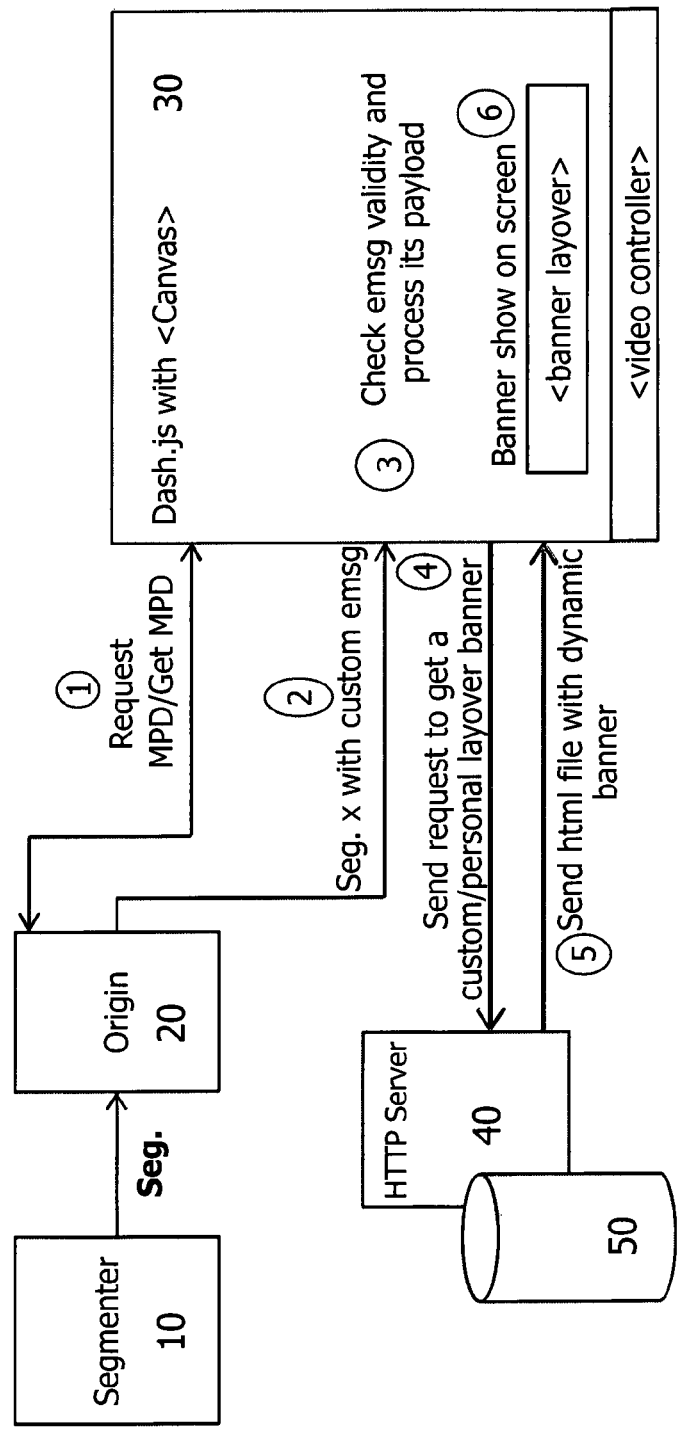
FIG. 1 illustrates a media content distribution system.
Figure 12:
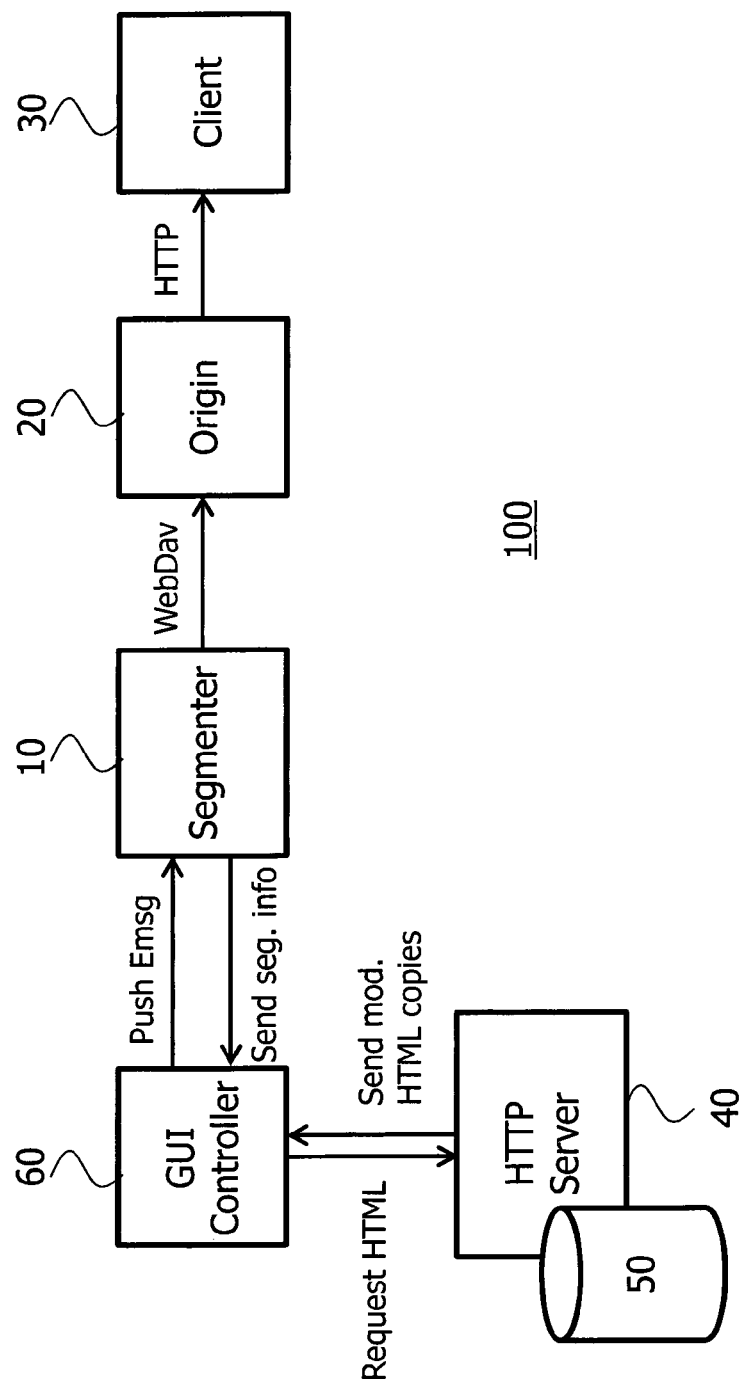
FIG. 12 illustrates a further embodiment of a media content distribution system.

FIG. 12 shows a further embodiment of a content distribution network system 100, wherein the same reference numerals as in FIG. 1 and FIG. 5 will be used to describe the same or similar components. As illustrated in FIG. 12, the network system 100 comprises a segmenter 10 that segments encoded video content (e.g., a sequence of video frames) into individual media file segments, an origin or streaming server 20 that provides the media file segments for download by a media client 30, a content server 40 with access to a repository 50 in which auxiliary media is stored, and a controller 60.

In the following, the network system 100 will be described in an exemplary DASH implementation and with reference to HTML-compliant auxiliary media (e.g., in a HTML5 format). It will be appreciated that other streaming protocols such as HLS may be used instead and that the auxiliary media may also be provided in other formats. Before describing the operation of the network system 100 in greater detail, some background on DASH and HTML5 is given as far as relevant for the present disclosure.

In an exemplary DASH realization, the synchronization between the rendering of video content and auxiliary media is established via so-called events and associated inband event messages in the media file segments. According to the DASH specification, an inband event message is defined by a so-called "emsg" box inserted in the media file segment before a so-called "moof" box. The "emsg" box has the following syntax:

```
aligned(8) class DASHEventMessageBox extends FullBox('emsg',
version = 0, flags = 0){
    string          scheme_id_uri;
    string          value;
    unsigned int(32)    timescale;
    unsigned int(32)    presentation_time_delta;
    unsigned int(32)    event_duration;
    unsigned int(32)    id;
    unsigned int(8)     message_data[ ];
    }
}
```

Each event has a specific duration @event_duration and typically starts once a certain media file segment is received or with a predefined delay as specified by @presentation_time_delta.

The attributes @scheme_id_uri and @value are used to identify an inband event message. The media client 30 (e.g., an application running on the media client 30) queues the inband event messages received in the media file segments and triggers an event listener associated with a specific inband event message (i.e., with a specific @scheme_id_uri and @value combination). The listener may be created based on information signalled via an InbandEventStream element in the MPD.

Beforehand, a set of instructions has been defined in the form of an event handler per @scheme_id_uri and @value combination, which will be executed by the media client 30 once an inband event message identified by the specific @scheme_id_uri and @value combination is received and detected by the associated listener. At the same time, the information (e.g., the auxiliary media or a link to the auxiliary media on, for example, a remote server) included in the inband event message as message_data[ ] will be handed over to the event handler. The auxiliary media may generally describe a simple overlay case, where graphics elements are overlaid to the video frame stream. The auxiliary media may additionally or as an alternative instruct the player to shrink, move or otherwise process the video content, so that for example framing effects can be generated.

In case of receiving an inband event message with an unknown @scheme_id_uri and @value combination, the message is discarded. Moreover, each inband event message has a unique identifier @id, and if the media client 30 receives the same inband event message (with the same @id) multiple times, it ignores the redundant inband event messages.

Now, turning to HTML5-based auxiliary media overlay, combining HTML5 with Cascading Style Sheet (CSS) and JavaScript permits the creation of high quality graphics with rich media content. HTML5 is well suited to describe and render any sort of graphical content. HTML generally supports combination of text graphic elements (including gradients, shadows and transparency effects) and images. It is possible to create timed sequences and fading effects using various HTML, CSS and JavaScript features.

In order to bring animation to HTML, animation CSS3 is used. In this manner an HTML element can be brought to life by changing its CSS properties according to a given time frame or user interaction. By specifying a CSS style within @keyframe rules, the style of the HTML element will change with time. The "animation-duration" attribute can be used to specify the duration of the animation, while the "animation-delay" attribute can be used to specify a delay for the start of an animation. The "animation-iteration-count" attribute specifies the number of times an animation should run. The "animation-direction" attribute is used to let an animation run in reverse direction or alternate cycles. The timing is relative to the instant that the HTML element is loaded in the browser page. Once the HTML element is loaded, the rendering starts manipulating the CSS property, and this property can be edited via JavaScript.

Figure 14:
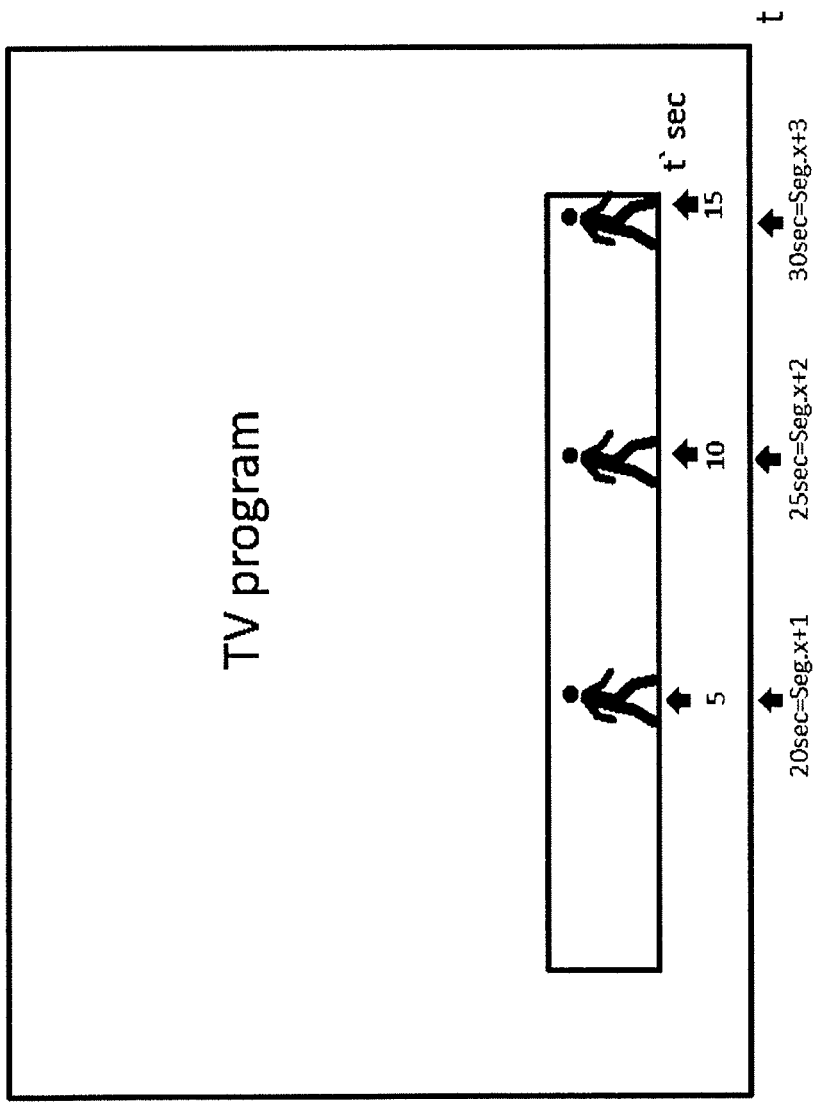
FIG. 14 illustrates synchronicity upon rendering of video frames and auxiliary media.

Returning to the network system 100 as illustrated in FIG. 12, its operation will now be described in more detail with reference to the schematic illustration in FIG. 14 and assuming that an event handler associated with a given custom event is a function that is rendering HTML-based animation over a video segment rendering according to given time sequence. In this regard, the media client 30 and the controller 60 may generally be operated as described above with reference to FIGS. 6, 10 and 11 with the following specific details.

1. Initially, a TV program editor or other broadcast or non-broadcast content provider uses a Graphical User Interface (GUI) of the controller 60 to control the rendering and playout of a given TV program as illustrated in FIG. 14. The controller 60 has previously retrieved a list of auxiliary media in the exemplary form of animations with their respective durations from the content server 40. The animations are stored on the content server in the exemplary form of HTML files.

2. The program editor selects one of the animations from the list using the controller 60. Assume that the duration of the selected animation is 15 sec.

3. Once a particular animation is selected, the controller 60 (on the playout side of the network system 100) requests from the segmenter 10 the currently generated segment (e.g., segment x) and the segment duration (e.g., 5 sec). Segment x will thus define the start of a sub-sequence of media file segments during which the animation is to be rendered in an overlaid manner.

In order to provide more fine-grain tuning of the animation, the GUI controller 60 may determine a Group Of Pictures (GOP) duration (i.e., the interval of Service Access Points, SAPs, in the media file segments). The media client 30 can typically start rendering from the start of a media file segment. When the media file segment contains more Intra Coded Frames (e.g., IDR frames in case of H.264 encoding), the media client 30 can allow more fine grain seeking (e.g., based on the SAPs).

4. The controller 60 calculates how many delayed versions of the animation HTML file underlying the selected animation are required by calculating the quotient of animation duration/segment duration (or animation length/number of SAPs in this segment duration). Here, the exemplary number of delayed versions is 15 sec/5 sec=3.

5. The controller 60 thus requests for the selected animation 3 HTML file versions from the content server 40 with 5 sec steps rendering progression.

6. The content server 40 modifies the CSS animation-delay attribute for each HTML file version and forwards the modified files to the controller 60. The animation-delay attribute thus constitutes control information that permits the media client 30 a determination of the progression of the animation upon rendering media file segments during the lifetime of the animation (see FIG. 6).

7. The controller 60 then generates 3 "emsgs" (or messages which trigger the generation of emsg messages) with the same @id but different versions of @data_message. Each @data_message carries a the auxiliary media in the form to the animation and control information in the form of an associated animation-delay attribute.

8. The three "emsgs" are then pushed to the segmenter 10 in order to ingest them in media file segments x, x+1 and x+2, respectively. These media file segments are then tagged by the segmenter 10 with the corresponding "emsg", wherein different segments will be tagged with different control information (i.e., suitably different animation-delay attributes).

As such, he segmenter 10 will insert "emsg" in all media file segments that contain a portion of the video content during which the animation is to be rendered (i.e., that overlap with the intended lifetime of the presentation, see also FIG. 6). The segmenter 10 forwards the tagged media file segments (e.g., via WebDAV) to the origin server 20, from where they can be downloaded by the media client 30 via HTTP as explained above.

9. It is now assumed, with reference to FIG. 14, that the media client 30 has tuned into the video frame segment stream at media presentation time t=20 sec. As such, the media client 30 starts downloading segment x+1.

10. The "emsg" in the downloaded media file segment x+1 contains all necessary control attributes such as @scheme_id_uri, @value and @id as well as the animation data and the control information (in the @data_message attribute). Moreover, it is assumed that the media client 30 has previously retrieved the MPD from the origin server 20 as explained above with reference to FIG. 1 and that the associated listeners and handlers have already been created prior to processing of the downloaded media file segment x+1 by the media client 30. The media client 30 triggers the listener associated with the received "emsg" as the "emsg" contains the necessary attributes such as @scheme_id_ur, @value and @id.

11. The media client 30 will then render the video frames included in media file segment x+1 together with the animation found in the @data_message. Due to the time shift of the animation (i.e., the content of the animation-delay attribute), the video frames of media file segment x+1 will be rendered in synchronicity with the shifted animation.

In the present, exemplary case, the @message_data carries an HTML file containing the animation and, optionally, instructions or code for adjusting animation rendering in response to seek operations. As explained previously, the server side (e.g., segmenter 10 and/or origin server 20) has slightly modified the HTML file fed into each media file segment such that segment x carries animation starting from t'=0, while segment x+1 carries animation starting at t'=5 and so on. Such modification may in particular be carried out by modifying the CSS "animation-delay" attribute to −ve value in seconds. In the given example the "animation-delay" is −5 sec.

When more fine grained seeking is supported, then the @data_message contains multiple versions of the animation and the media client 30 selects the version according to the SAP index in the media file segment x+1. For example, when the media client 30 starts rendering from the first SAP in the media file segment x+1, the media client 30 uses the first animation in the @data_message. When the player starts rendering from the third SAP of that segment, the third animation in the @data_message is used, and so on. Of course, the control information (animation-delay attribute) may need to be adjusted appropriately for each version of the animation)

12. When the media client 30 processes the next media file segment x+2, it will ignore the inband event message because it carries the same @id as segment x+1

13. If the media client 30 now decided to seek again to t=25 sec (based on a user-defined seek command defining a particular seek parameter in accordance with t=25 sec), the media client 30 is configured to modify the animation-delay attribute to the seek parameter (i.e., animation delay=−10 sec). The modification may be performed under control of the HTML code in the HTML file received with segment x+1.

The modified animation-delay attribute can be regarded to constitute a modified seek parameter specifically applicable to the animation rendering. The media client 30 will render the animation in accordance with the modified animation-delay value/modified seek parameter. Such modification by the media client 30 is essential because the media client 30 will ignore the inband event message received with segment x+2 (with the proper animation-delay attribute but the same @id) although a change in the rendering and playout has occurred.

In case the media consumer decided to seek to t=35, the media client 30 will change the "animation-delay" attribute to −20 sec. Such value is out of bound of the animation timeline (15 sec) and the animation will simply disappear.

Figure 13:
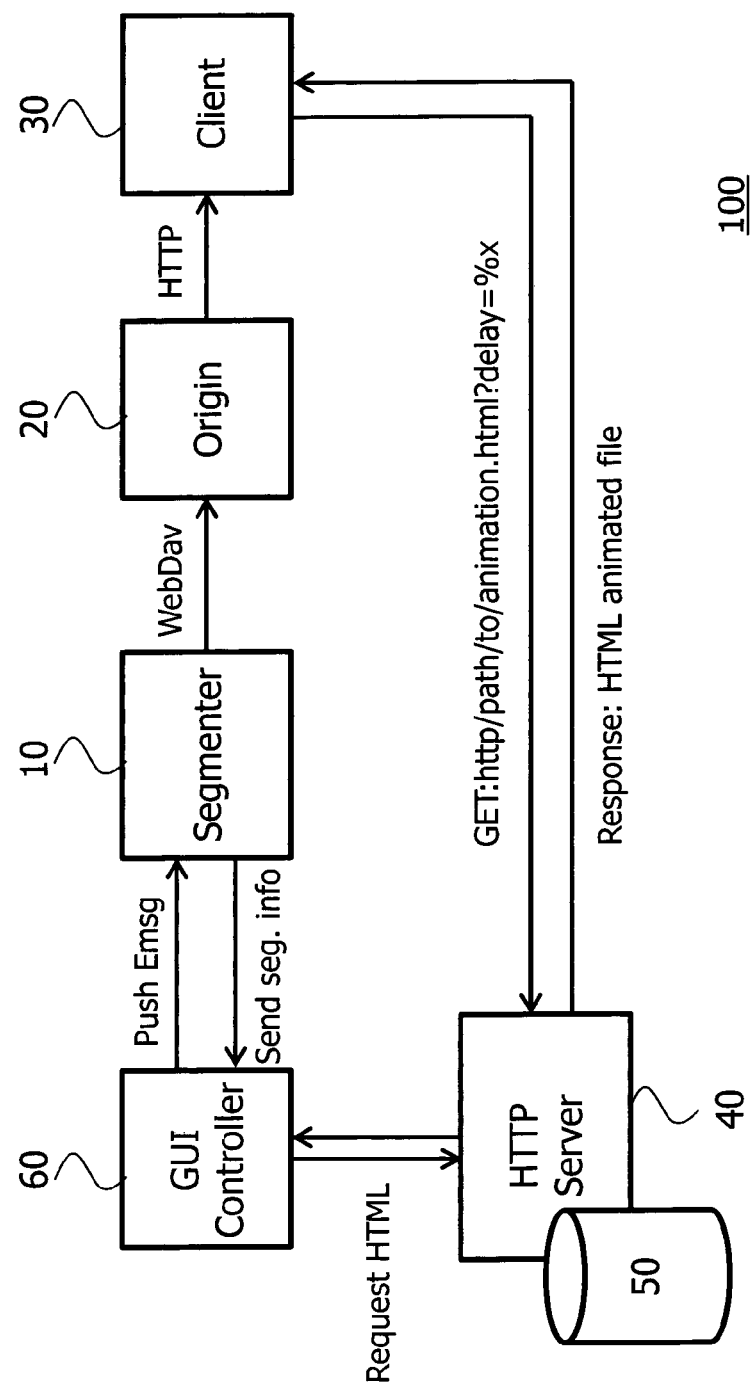
FIG. 13 illustrates a still further embodiment of a media content distribution system.

In the following, an alternative operation of the network system 100 illustrated in FIG. 12 will be described with reference to FIG. 13. Here, the auxiliary media (again an exemplary HTML animation) is not included inband (i.e., in the media file segments), but will be retrieved by the media client 30 directly from the content server 40. To this end, the inband event messages are generated to include a link to the required auxiliary media on the content server 40. Again, the media client 30 and the controller 60 may generally be operated as described above with reference to FIGS. 6, 10 and 11 with the following specific details. It will be assumed that steps 1 to 3 as explained above will essentially remain the same, so that the alternative operation will continue as follows.

4. The controller 60 requests a Universal Resource Locator (URL) for the animation from the content server 40.

5. The controller 60 creates and pushes to the segmenter 10 multiple "emsgs" with same @id and the following content of the @data_message:
   a. @url attribute pointing to the HTML file in the content server 40: http://path/to/animation.html?delay=%x
   b. @timestamp: It contains the media time in which the animation should be rendered (e.g., relative to a media presentation time of the video content, i.e., the sequence of media file segments illustrated in FIG. 5)

6. The media client 30 calculates the timeshift (e.g., −5 sec) when rendering or tuning into the sequence of media file segments (see FIG. 5) by:

Delay=current media time−timestamp

7. The media client 30 then requests from the HTTP server 40 the HTML file with the required animation using the URL "http://path/to/animation.html?delay=−5

8. The media client 30 obtains the HTML file and the HTML file is modifying the value of "animation-delay"=−5 sec using JavaScript within the HTML animation code. In other words, the modification is performed after the download, and a browser engine on the media client 30 is responsible for executing the corresponding JavaScript function. This function will retrieve the delay parameter (in the present case from the URL) and edit the CSS accordingly.

9. In case of seeking to t=25 sec, the media client 30 is re-calculating the delay parameter and re-fetches the animation HTML once more but with modified delay=−10 sec.

As has become apparent from the above description of exemplary embodiments, the technique presented herein provides several advantages. Instead of encoding the auxiliary media with the video content at the source network, by moving the auxiliary media overlay to the client side, this could reduce complexity at the source network side give flexibility to customize auxiliary media to each user without the need to re-encode the content.

Client side overlaid banners, animated graphics, widgets, and so on have the advantage that actual video content does not need to be re-encoded with the auxiliary media. The same video clip can be used for different repetitions with different auxiliary media. Content can be prepositioned in a content distribution network or at a client side and it would still be possible to adjust the auxiliary media. Further, in case of personalized TV channels (e.g., the sequence of programs depends on the user or user group), auxiliary media can still announce upcoming programs, tailored to the personalized TV channel.

Figure 2:
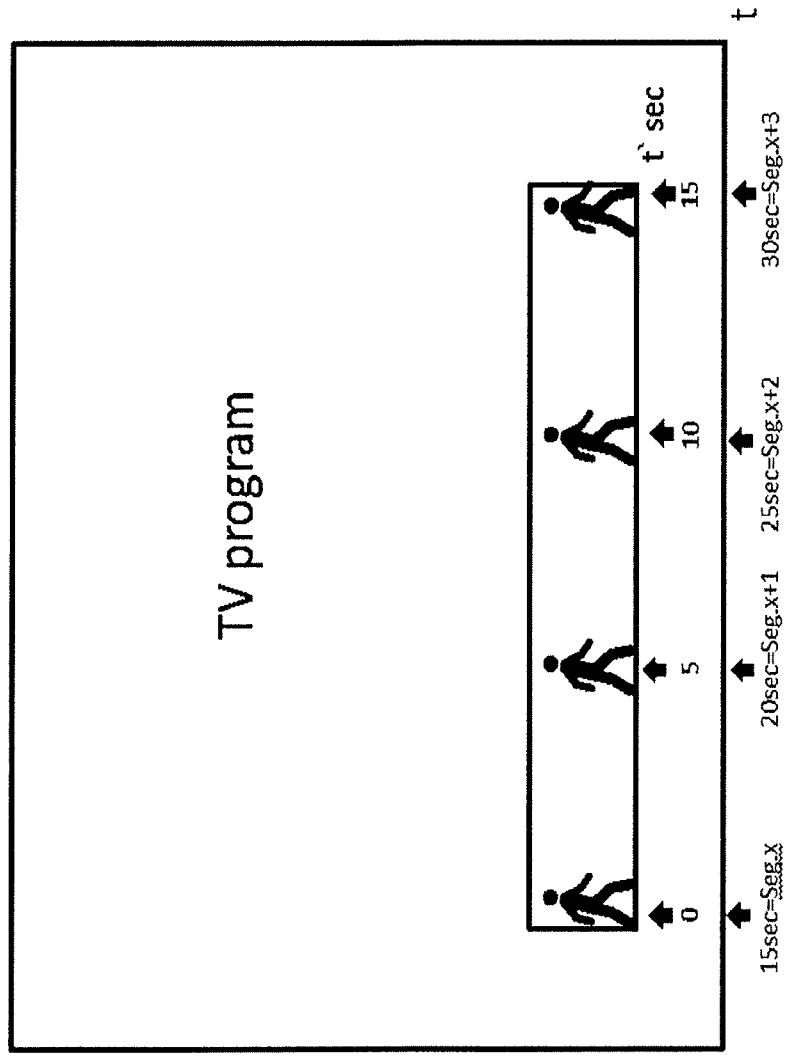
FIGS. 2 to 4 illustrate a lack of synchronicity upon rendering of video frames and auxiliary media.
Figure 3:
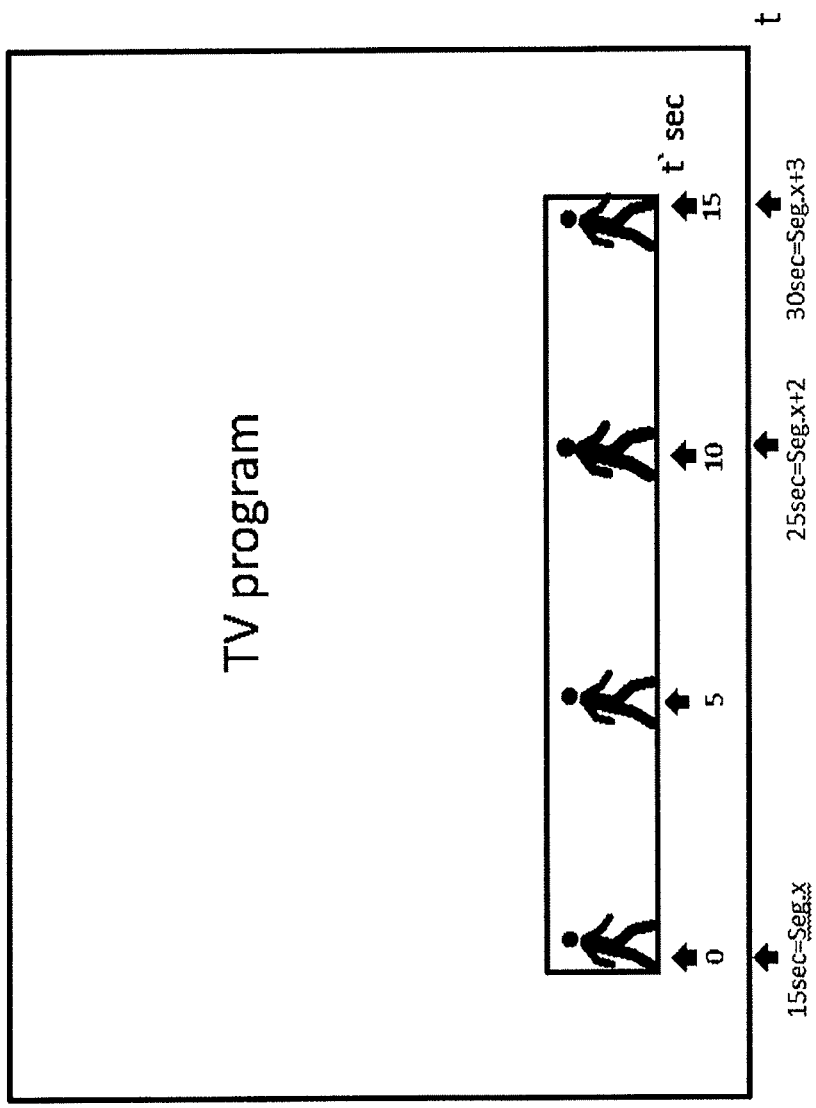
Figure 4:
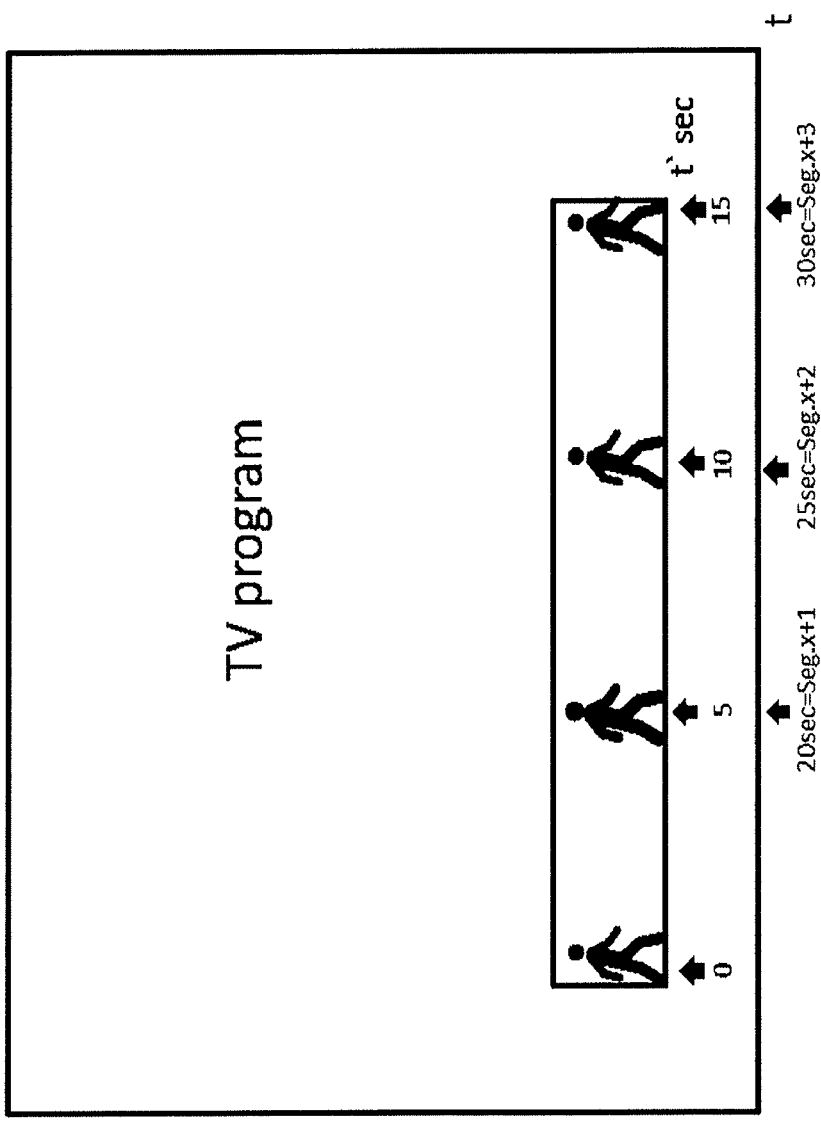

Auxiliary media overlays shown during the video content rendering may be highly correlated with the playout of the video content. Therefore, one has to make sure that the media client is rendering the auxiliary media in synchronization with the video content playout. FIGS. 2 to 4 illustrate several exemplary use cases where user operation can cause the auxiliary media rendering to become out of synchronicity.

Certain embodiments solve this issue by providing the media client with control information about the current progress of the auxiliary media overlay relative to the current media file segment. This can take place by repeating control information with the same identifier and adding a counter field which marks the elapsed time since the auxiliary media started (e.g., in terms of media file segments). When knowing the segment duration the media client can calculate how much the auxiliary media will be out of synchronicity. Hence, in some embodiments, when media client requests the auxiliary media, it calculates the delay in (e.g., negative) magnitude (e.g., in seconds) and signals the delay in a request for the auxiliary media or simply applies the delay locally upon receipt of the requested auxiliary media.

The invention claimed is:

1. A method of tagging media file segments with control information for a synchronized rendering of video frames included in the media file segments and auxiliary media by a media client, the method comprising:
   determining, from a sequence of media file segments, a sub-sequence of media file segments, wherein rendering of the sub-sequence is to be overlaid by rendering of the auxiliary media starting in a first media file segment of the sub-sequence;
   determining the control information enabling the media client to determine how much rendering of the auxiliary media has progressed upon rendering of each media file segment of the sub-sequence, wherein the control information is indicative of a distance between: the first media file segment or the start of the rendering of the auxiliary media in the first media file segment, and the respective media file segment, and wherein the distance is expressed at least as a number of media file segments between the first media file segment and the respective media file segment; and
   initiating the tagging of the media file segments of the sub-sequence with the control information, wherein the initiating of the tagging of the media file segments of the sub-sequence with the control information comprises:
     providing the control information to a segmenter; and
     instructing the segmenter to perform the tagging of the media file segments.

2. The method of claim 1, wherein for each media file segment of the sub-sequence, associated control information is individually determined, to tag the respective media file segment with the associated control information.

3. The method of claim 1, wherein the distance is expressed further at least as a period of time between the start of the rendering of the auxiliary media in the first media file segment and the respective media file segment.

4. The method of claim 1, wherein the rendering of the auxiliary media is configured to start with the start of the first media file segment; or a predefined time shift relative to the start of the first media file segment.

5. The method of claim 1, wherein each of the media file segments in the sub-sequence further comprises one of:
   at least a portion of the auxiliary media; and
   a link to at least a portion of the auxiliary media.

6. The method of claim 5, wherein the auxiliary media portion is progressed relative to a full version of the auxiliary media by the distance between the start of the rendering of the auxiliary media in the first media file segment and the respective media file segment.

7. The method of claim 1, wherein one or more media file segments of the media file segments are tagged by packing the control information in a logical container in the respective media file segment, wherein the logical container has an identifier configured to suppress repeated processing by the media client of logical containers bearing the same identifier in different media file segments, and wherein the same identifier is assigned to the media file segments in the sub-sequence.

8. A method of rendering video frames in synchronization with auxiliary media by a media client, the method comprising:
receiving a sequence of media file segments, each media file segment comprising a plurality of video frames, wherein rendering of a sub-sequence of media file segments is to be overlaid with rendering of the auxiliary media starting in a first media file segment of the sub-sequence, wherein each media file segment of the sub-sequence of the media file segments is separately received in response to a request from the media client, and wherein each media file segment of the sub-sequence is individually downloaded via Hypertext Transfer Protocol (HTTP);
determining, from control information included in the sub-sequence of the media file segments and for a respective one of the media file segments of the sub-sequence, how much rendering of the auxiliary media has progressed upon rendering the respective media file segment, wherein the control information is indicative of a distance between: the first media file segment or the start of the rendering of the auxiliary media in the first media file segment, and the respective media file segment, and wherein the distance is expressed at least as a number of media file segments between the first media file segment and the respective media file segment; and
rendering the video frames of the respective media file segment of the sub-sequence and rendering the auxiliary media in accordance with the determined progression.

9. The method of claim 8, wherein each media file segment of the sub-sequence comprises individual control information specifically associated with the respective media file segment.

10. The method of claim 8, further comprising:
receiving, during rendering of the sequence of the media file segments, a seek command defining a seek parameter;
determining a modified seek parameter based on the seek parameter and the control information; and
rendering the video frames in accordance with the seek parameter and rendering the auxiliary media based on the modified seek parameter.

11. The method of claim 10, further comprising:
requesting a progressed version of the auxiliary media based on the modified seek parameter; and
receiving the progressed version of the auxiliary media, wherein the progressed version of the auxiliary media is rendered.

12. The method of claim 8, wherein each of the media file segments in the sub-sequence further comprises at least a portion of the auxiliary media.

13. The method of claim 8, wherein each of the media file segments in the sub-sequence further comprises a link to at least a portion of the auxiliary media, and wherein the method further comprises requesting and receiving at least the portion of the auxiliary media via the link.

14. A computer program product comprising a non-transitory computer readable medium storing a computer program comprising instructions which, when executed on at least one processor, cause the at least one processor to carry out the method according to claim 1.

15. A controller configured to initiate tagging of media file segments with control information for a synchronized rendering of video frames included in the media file segments and auxiliary media by a media client, the controller being configured to:
determine, from a sequence of media file segments, a sub-sequence of media file segments, wherein rendering of the sub-sequence is to be overlaid by rendering of the auxiliary media starting in a first media file segment of the sub-sequence;
determine the control information enabling the media client to determine how much rendering of the auxiliary media has progressed upon rendering of each media file segment of the sub-sequence, wherein the control information is indicative of a distance between: the first media file segment or the start of the rendering of the auxiliary media in the first media file segment, and the respective media file segment, and wherein the distance is expressed at least as a number of media file segments between the first media file segment and the respective media file segment; and
initiate the tagging of the media file segments of the sub-sequence with the control information, wherein to initiate the tagging of the media file segments of the sub-sequence with the control information, the controller is configured to:
provide the control information to a segmenter; and
instruct the segmenter to perform the tagging of the media file segments.

16. A media client configured to render video frames in synchronization with auxiliary media, the media client being configured to:
receive a sequence of media file segments, each media file segment comprising a plurality of video frames, wherein rendering of a sub-sequence of media file segments is to be overlaid with rendering of the auxiliary media starting in a first media file segment of the sub-sequence, wherein each media file segment of the sub-sequence of the media file segments is separately received in response to a request from the media client, and wherein each media file segment of the sub-sequence is individually downloaded via Hypertext Transfer Protocol (HTTP);
determine, from control information included in the sub-sequence of the media file segments and for a respective one of the media file segments of the sub-sequence, how much rendering of the auxiliary media has progressed upon rendering the respective media file segment, wherein the control information is indicative of a distance between: the first media file segment or the start of the rendering of the auxiliary media in the first media file segment, and the respective media file segment, and wherein the distance is expressed at least as a number of media file segments between the first media file segment and the respective media file segment; and
render the video frames of the respective media file segment of the sub-sequence and render the auxiliary media in accordance with the determined progression.

* * * * *